(12) United States Patent
Zai et al.

(10) Patent No.: US 9,092,207 B2
(45) Date of Patent: Jul. 28, 2015

(54) CIRCUIT FOR SUPPLEMENTING ELECTRICAL CURRENT TO A PERIPHERAL DEVICE

(75) Inventors: Yu Nang Zai, Singapore (SG); James Lai Kein Chang, Singapore (SG); Kah Liang Gan, Singapore (SG); Pei Koh Lee, Singapore (SG); Wei Loon Ng, Singapore (SG); Lina Wang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 643 days.

(21) Appl. No.: 12/833,900

(22) Filed: Jul. 9, 2010

(65) Prior Publication Data

US 2012/0011376 A1 Jan. 12, 2012

(51) Int. Cl.
*G06F 1/26* (2006.01)

(52) U.S. Cl.
CPC ........ *G06F 1/26* (2013.01); *G06F 1/263* (2013.01); *G06F 1/266* (2013.01)

(58) Field of Classification Search
CPC .................... G06F 1/26; G06F 1/3203
USPC ........................ 713/300, 320, 323
See application file for complete search history.

(56) References Cited

U.S. PATENT DOCUMENTS

| | | | |
|---|---|---|---|
| 6,345,369 B1 * | 2/2002 | Kitamorn et al. | 714/14 |
| 6,782,491 B1 * | 8/2004 | Foedlmeier et al. | 714/37 |
| 7,952,231 B1 * | 5/2011 | Zansky et al. | 307/59 |
| 2001/0003205 A1 * | 6/2001 | Gilbert | 713/320 |
| 2009/0217059 A1 * | 8/2009 | Gervais et al. | 713/300 |
| 2009/0228823 A1 * | 9/2009 | Edwards et al. | 715/772 |
| 2010/0156175 A1 * | 6/2010 | Wei | 307/31 |
| 2010/0169677 A1 * | 7/2010 | Madhusoodanan | 713/310 |
| 2010/0301673 A1 * | 12/2010 | Riedel et al. | 307/66 |

\* cited by examiner

*Primary Examiner* — Jaweed A Abbaszadeh
*Assistant Examiner* — Alyaa T Mazyad
(74) *Attorney, Agent, or Firm* — Hall Estill Attorneys at Law

(57) ABSTRACT

A data bus can supply power from a first power source to a sink device. The data bus is coupled to a second power source. An electrical current from the second power source supplements an electrical current on the data bus if the voltage on the data bus decreases to less than a threshold value.

20 Claims, 3 Drawing Sheets

| MODE | P11 SIGNAL | Vusb | POWER SOURCE(S) | BATTERY CHARGING? |
|---|---|---|---|---|
| STANDBY | LOW | > 4.7 V | USB ONLY | YES |
| OFF | -- | -- | -- | YES |
| ACTIVE | HIGH | > 4.7 V | USB ONLY | NO |
| ACTIVE | HIGH | ≤ 4.7 V | USB AND BATTERY | NO |

CIRCUIT FOR SUPPLEMENTING ELECTRICAL CURRENT TO A PERIPHERAL DEVICE

BACKGROUND

According to the Universal Serial Bus (USB) specification, host USB devices can power other (e.g., peripheral) devices. Host USB devices, such as personal computers and notebook computers, can provide up to but not more than 500 milli-amperes (mA) of electrical current to a peripheral device such as a portable storage device (e.g., a portable hard disk drive).

Contemporary portable storage devices (e.g., 2.5-inch portable hard disk drives) can consume up to 1000 mA of current during read or write operations, not including the amount of current consumed by the USB-to-SATA (Serial Advanced Technology Attachment) bridge integrated circuit. Clearly, the amount of current needed by a portable storage device can exceed the limit included in the USB specification.

To overcome this problem, some types of portable storage devices are equipped with a USB Y-cable that allows the drive to be plugged into two USB ports at the same time. A portable storage device can thus draw up to 500 mA of current from one USB port and up to another 500 mA of current from another USB port, thereby obtaining the amount of current needed for read and write operations. However, this type of solution may be problematic because the host device may not have two available USB ports. That is, the host device's USB ports may be needed for other purposes, and it may not be possible to devote two ports to a single device such as a portable storage device.

Other types of portable storage devices are instead equipped with a power adapter that allows them to be plugged into an external power supply (e.g., an electrical outlet). However, this type of solution is cumbersome and inconvenient, especially for a storage device that is supposed to be portable. In other words, a power adapter can be relatively bulky, and its use requires that the portable storage device be placed with reach of an electrical outlet (e.g., a wall outlet).

SUMMARY

Embodiments according to the invention provide solutions to the problems described above. In one embodiment, a data bus is also used to supply power from a first power source to a sink device. A second power source can supplement the electrical current on the data bus if the voltage on the data bus decreases to less than a threshold value.

More specifically, in one embodiment, a power circuit for a portable storage device (e.g., a portable hard disk drive) includes a rechargeable battery and a USB cable that can be plugged into a USB port on a host device. While the storage device is operating, it can draw power (electrical current) both from the battery and from the host device via the USB cable. While the storage device is in standby mode or is turned off, the battery can be recharged by the host device via the USB cable. Combined, the battery and the host device provide the peak amount of electrical current (e.g., 1000 mA) needed by the storage device.

Thus, for example, a storage device can be operated using only a single USB port, and a separate power adapter is not needed.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Figure 1:
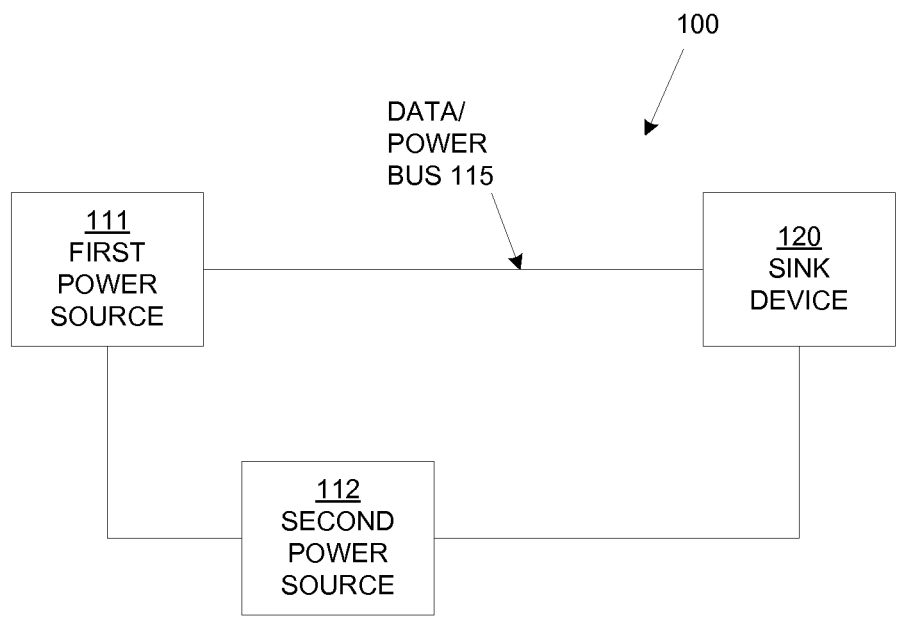
FIG. 1 is a block diagram of a circuit according to an embodiment of the invention.

In overview, with reference to FIG. 1, a circuit 100 delivers power from a first power source 111 to a sink device 120 via a power/data bus (or cable) 115 that can simultaneously carry both power (electrical current) and data. The first power source 111 can be supplemented by a second power source 112. Specifically, in one embodiment, if the voltage on the bus 115 decreases to below a threshold value, then power from the second power source 112 is provided to the sink device 120. In such an embodiment, the circuit 100 can include a boost converter (not shown in FIG. 1; refer to FIG. 2) that is coupled between the second power source 112 and the sink device 120.

Continuing with reference to FIG. 1, in one embodiment, the bus 115 is a Universal Serial Bus (USB) and the first power source 111 is a host device (e.g., a personal computer system). The USB cable can be plugged into the host device, which can provide up to 500 mA of electrical current to the sink device 120.

In one embodiment, the second power source 112 can also provide up to 500 mA of electrical current to the sink device. In one embodiment, the second power source 112 is a battery. The battery can be a rechargeable battery. Accordingly, in such an embodiment, the circuit 100 can include a battery charger (not shown in FIG. 1; refer to FIG. 2) that is coupled to the first power source 111. The battery charger can be turned on to charge the battery when the sink device 120 is in standby mode or otherwise is not operating (e.g., it is turned off), and the battery charger can be turned off when the sink device 120 is active. In other words, when the sink device 120 is active, it can be powered by both the first power source 111 and the second power source 112. Otherwise, the first power source 111 can be used to recharge the second power source 112.

As noted above, the second power source 112 of FIG. 1 can be brought into use when the voltage on the bus 115 drops to a threshold value, in order to supplement the first power source 111. Together, the first and second power sources 111 and 112 can satisfy the peak demands of the sink device 120. In one embodiment, the sink device 120 is a portable storage device (e.g., a portable hard disk drive). In such an embodiment, the first and second power sources 112 can provide up to a combined 1000 mA of electrical current to the storage device.

Figure 2:
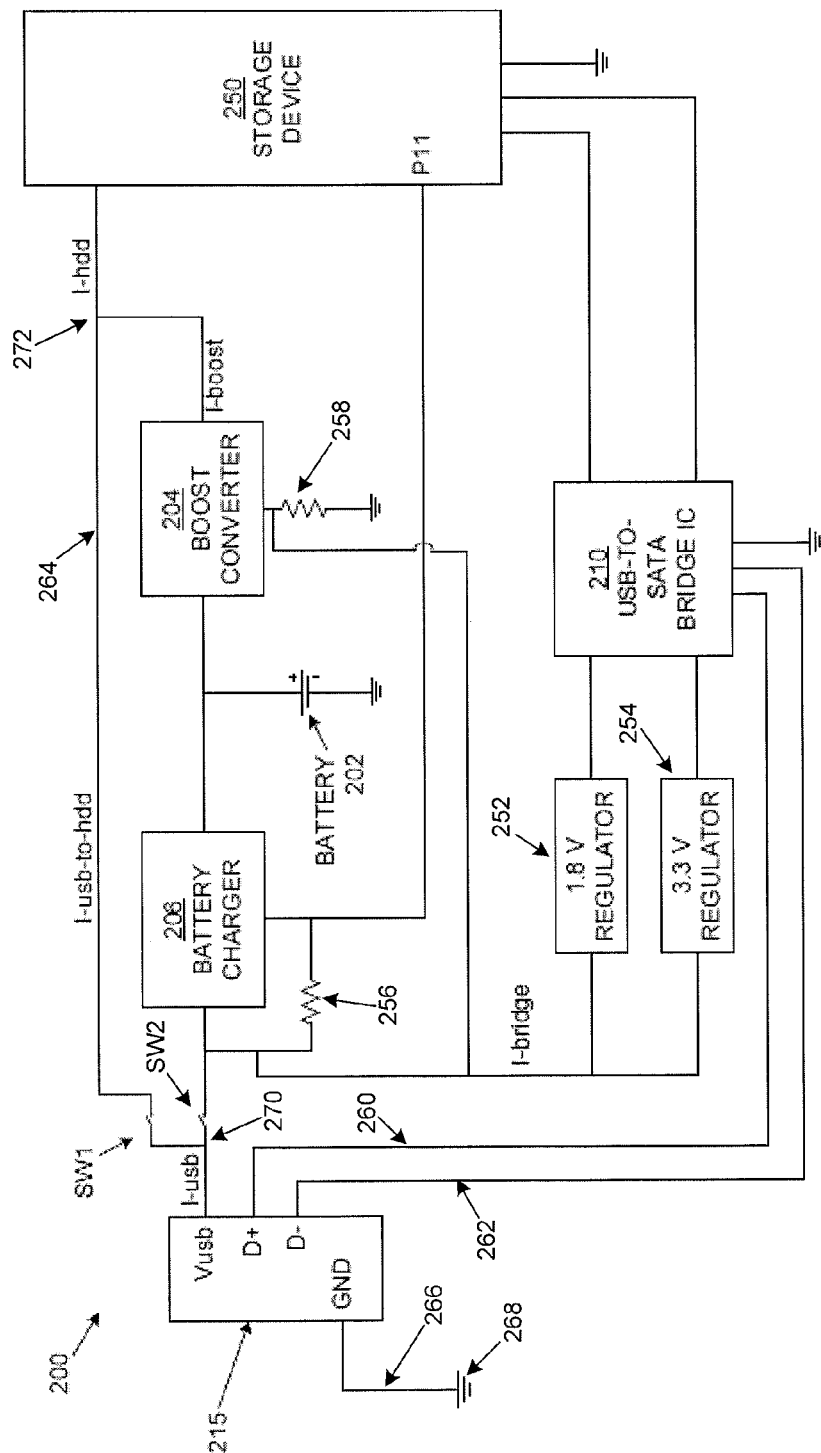
FIG. 2 is a schematic/block diagram of a circuit according to an embodiment of the invention.

FIG. 2 is a schematic diagram showing elements of a circuit 200 that can be used to power a portable storage device 250 in one embodiment according to the invention. In the embodiment of FIG. 2, the circuit includes a battery 202, a boost converter 204, a battery charger 206, a gang switch SW1, and a USB-to-SATA bridge integrated circuit 210. The circuit 200 also includes a USB plug 215 (e.g., a Type A plug) that can be plugged into a USB port on a host device. As shown in FIG. 2, the circuit 200 also includes other components such as, but not limited to, voltage regulators 252 and 254, resistors 256 and 258, and other internal circuitry such as switch SW2. The USB plug 215 is coupled to first and second (D+ and D−) data conductors 260, 262 and first and second (Vusb and GND) power conductors 264, 266, as shown. The D+ and D− data conductors 260, 262 interconnect the USB plug 215 and the storage device 250 via the USB-to-SATA bridge integrated circuit 210. The Vusb power conductor 264 interconnects the USB plug 215 and the storage device 250 to provide a positive supply voltage Vusb. The GND power conductor 266 interconnects to electrical ground 268. The battery charger 206, the battery 202 and the boost converter 204 are connected in parallel with the Vusb power conductor 264 as shown between an upstream connection node 270 and a downstream connection node 272 along the Vusb power conductor 264. The voltage Vusb is sensed by the boost converter 204 via the resistor 258.

The battery 202 can be a lithium-ion rechargeable battery, in which case the battery charger 206 is a lithium-ion battery charger. In one embodiment, the battery 202 supplies 3.7 volts (V) and the boost converter 204 is a 3.7 V to 4.7 V boost converter. However, as will be seen, such values are simply a matter of design choice.

In operation, the circuit 200 works as follows. The USB port on the host device will provide 500 mA of current (I-usb). Of that amount, about 100 mA of current (I-bridge) will be consumed by the integrated circuit 210, leaving about 400 mA (I-usb-to-hdd) for delivery to the storage device 250. This amount of current, by itself, is insufficient to power the storage device 250.

As the 500 mA current limit from the USB port becomes a factor, the voltage Vusb will start to drop. When Vusb reaches a threshold value, the boost converter 204 will start to draw power from the battery 202 in order to provide a supplemental current (I-boost) that is needed to power up and operate the storage device 250. In other words, the amount of current (I-hdd) provided to the storage device is the sum of I-usb-to-hdd and I-boost. In one embodiment, the boost converter supplies an additional 500 mA of current. Thus, the current from the boost converter 204 supplements the current from the USB port and provides the extra current needed to spin up and operate the storage device 250.

In one embodiment, the threshold value is 4.7 V; as mentioned above, this value is a matter of design choice. In general, the threshold value corresponds to the characteristics of the boost converter 204, and vice versa.

The switches SW1 are switched on (closed) when the storage device 250 is turned on. The switches SW1 are otherwise switched off (opened) to prevent the battery 202 from draining.

Thus, as just described, the battery 202 is not used until the voltage Vusb drops to the threshold value (e.g., 4.7 V). The battery 202 can be recharged when it is not needed. More specifically, the battery 202 can be recharged each time the storage device 250 is in standby mode or is powered off.

In one embodiment, the storage device 250 is equipped with an automatic standby feature that places the drive in standby mode when the drive has been inactive for a specified period of time. In one embodiment, if the storage device 250 has not received a command from the host for a period of 30 seconds, then the drive automatically enters standby mode. In standby mode, the amount of current drawn by the storage device 250 is reduced to about 150 mA. The 30-second threshold is a matter of design choice.

The battery charger 206 uses current from the host device (specifically, current from the USB port) to recharge the battery 202. In one embodiment, the battery charger 206 is turned on in response to a signal from the storage device 250 that indicates the drive is in standby mode. In one such embodiment, the P11 pin of the storage device 250 is used to provide that signal. More specifically, when the storage device 250 is in standby mode, a logic-low signal from the P11 pin can be used to turn on the battery charger 206. In response to a command from the integrated circuit 210, the storage device 250 can be awakened and can enter active mode. Consequently, the P11 pin will send a logic-high signal that will turn off the battery charger 206.

The P11 pin is conventionally used to turn on a light-emitting diode to provide a visual indication that the storage device 250 is operating. Thus, the P11 pin provides an elegant means of turning on and off the battery charger 206.

Figures 3, 4:
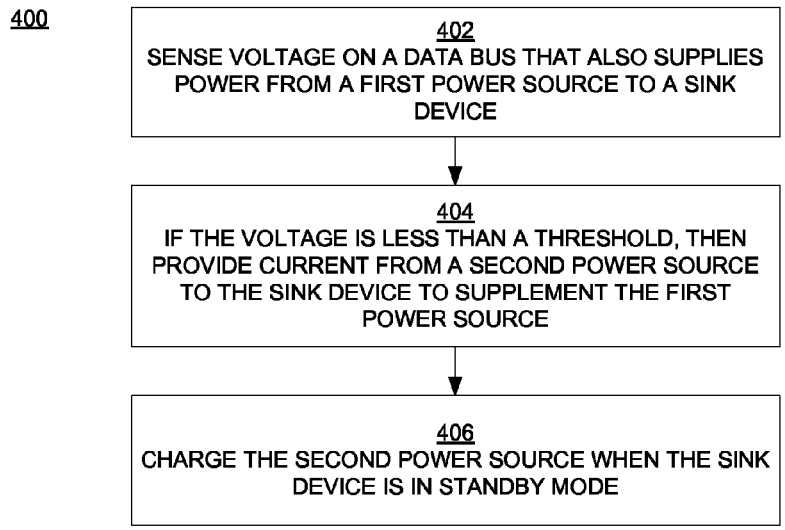
FIG. 3 is a table summarizing operating modes for a circuit according to an embodiment of the invention.
FIG. 4 is a flowchart of a method for powering a device according to an embodiment of the invention.

To summarize, with reference to FIG. 3, when the storage device 250 is operating (in active mode) and Vusb is greater than 4.7 V, then the storage device receives an amount of current I-usb-to-hdd from the USB port and the battery charger 206 is turned off. In active mode, once Vusb falls to less than 4.7 V, then the storage device 250 receives both the current I-usb-to-hdd and an amount of current I-boost from the battery 202 via the boost converter 204 (I-usb-to-hdd plus I-boost, equal to I-hdd).

When the storage device 250 is not operating (e.g., in standby mode), then the current from the USB port is instead used to recharge the battery 202. Recharging the battery 202 does not affect operation of the storage device 205 in standby mode, because the current demanded by the drive in standby mode is reduced and can be satisfied by just the current I-usb-to-hdd.

The battery 202 can also be charged when the storage device 250 is turned off.

Thus, embodiments according to the present invention provide sufficient power (specifically, electrical current) to a peripheral device using a single power/data cable by selectively supplementing the power (current) carried by the cable with power (current) from a second power source.

FIG. 4 is a flowchart 400 of a method for powering a peripheral device according to an embodiment of the invention. In block 402, voltage on a data bus that supplies power from a first power source to a sink device is sensed. In one embodiment, the data bus is a USB, the sink device is a storage device (e.g., a portable hard disk drive), and the rechargeable second power source is a battery. As shown in FIG. 2, the voltage Vusb on the power conductor 264 may be sensed by the boosting circuit 204 using the voltage sense resistor 258, which is connected between the upstream connection node 270 of the power conductor 264 and electrical ground 268.

In block 404, in response to the sensed voltage falling to less than a threshold value, current is provided from a rechargeable second power source to the sink device to supplement current from the first power source.

In block 406, charging of the rechargeable second power source is initiated in response to the sink device transitioning from active mode to standby mode.

In summary, according to embodiments of the present invention, a peripheral device—for example, a portable storage device such as a portable hard disk drive—can be powered using only a single USB port, without using an extra USB Y-cable or a power adapter. More than 500 mA of current can be delivered to the peripheral device using a single USB port that is limited to providing only 500 mA of current.

Because only a single USB port is needed, other USB ports can be allocated to other uses. Because an adapter is not needed, the peripheral device is less cumbersome and easier to use.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Thus, although described for examples based on USB and portable storage devices such as portable hard disk drives, embodiments of the invention can be utilized with other types of standards and other types of devices.

Embodiments according to the invention are thus described. While the present disclosure has been described in particular embodiments, it should be appreciated that the invention should not be construed as limited by such embodiments, but rather construed according to the below claims.

What is claimed is:

1. An apparatus comprising:
a data bus comprising a data conductor adapted to supply data signals to a sink device and a power conductor adapted to supply power from a first power source to the sink device;
a second power source connected in parallel to the power conductor between an upstream connection node and a downstream connection node along the power connector, an electrical current from the second power source combined at the downstream node with an electrical current on the power conductor from the first power source in response to a voltage on the power conductor decreasing below a threshold value; and
a recharging circuit which receives a signal provided to a light emitting diode (LED) of the sink device, the received signal having a first logic level during an inactive mode of the sink device and a second logic level during an active mode of the sink device, the recharging circuit recharging the second power source responsive to the received signal having the first logic level and interrupts recharging of the second power source responsive to the received signal transitioning to the second logic level.

2. The apparatus of claim 1 wherein the data bus comprises a Universal Serial Bus (USB).

3. The apparatus of claim 1 wherein the sink device comprises a storage device.

4. The apparatus of claim 1 wherein the second power source comprises a rechargeable battery and a boost converter connected in series between the upstream and downstream connection nodes along the power conductor, and wherein the rechargeable battery is recharged by the recharging circuit responsive to the received signal transitioning to the first logic level.

5. The apparatus of claim 4, wherein the recharging circuit discontinues further charging of the rechargeable battery responsive to a detection of the voltage provided to the LED transitioning to the second logic level.

6. The apparatus of claim 5, wherein the recharging circuit further operates to monitor the voltage on the power conductor and to direct charging of the rechargeable battery responsive to the voltage on the power conductor being above the threshold value.

7. The apparatus of claim 5 wherein the sink device transitions from the active mode to the standby mode after the sink device is inactive for a prescribed period of time.

8. The apparatus of claim 1 in which the second power source further comprises a sense resistor connected between the upstream connection node of the power conductor and electrical ground, wherein the second power source outputs the electrical current from the second power source to the downstream node responsive to a voltage at the sense resistor decreasing below the threshold value.

9. The apparatus of claim 1 further comprising a switch coupled to the second power source, wherein the switch is closed when the sink device is turned on, and wherein the switch is open when the sink device is turned off to prevent draining of the second power source.

10. A method comprising:
sensing a first voltage on a power conductor of a data bus that supplies power from a first power source to a sink device, the first voltage sensed using a sense resistor connected in parallel to the power conductor;
in response to the first voltage falling below a threshold value, providing supplemental current from a rechargeable second power source to the power conductor upstream of the sink device to supplement current from the first power source;
monitoring a second voltage provided to a light emitting diode (LED) of the sink device that transitions between a high voltage level during an active mode and a low voltage level during an inactive mode; and
using electrical current from the first power source to recharge the rechargeable second power source responsive to the second voltage transitioning to the low voltage level.

11. The method of claim 10 wherein the data bus comprises a Universal Serial Bus (USB), the sink device comprises a storage device, and the rechargeable second power source comprises a battery.

12. The method of claim 10 further comprising connecting the rechargeable second power source in parallel to the power conductor between an upstream connection node and a downstream connection node along the power conductor so that the electrical current from the rechargeable second power source is summed with the current from the first power source and provided as a single combined current to the sink device along a portion of the power conductor between the downstream node and the sink device.

13. The method of claim 10 further comprising:
closing a switch when the sink device is turned on; and
opening the switch when the sink device is turned off to prevent draining of the second power source.

14. An apparatus comprising:
a powered data cable operable for connecting a host power source and a peripheral device;
a chargeable power source coupled to the powered data cable, wherein the chargeable power source is operable for supplying a current that supplements a current on the powered data cable; and
a charging circuit coupled to the chargeable power source and operable for receiving a signal from the peripheral device, the charging circuit configured to begin charging the chargeable power source in response to a change in state of the received signal, the signal activating a light emitting device that produces light visible to a human observer during an active mode of the peripheral device, the signal deactivating the light emitting device during a standby mode of the peripheral device and activating the charging circuit.

15. The apparatus of claim 14 wherein the peripheral device comprises a storage device and the light emitting device is a light emitting diode (LED) that provides a visual indication that the storage device is operating.

16. The apparatus of claim 14 wherein the second power source comprises a rechargeable battery.

17. The apparatus of claim 14 wherein the signal changes state in response to the peripheral device transitioning between the active mode and the standby mode.

18. The apparatus of claim 17 wherein the peripheral device transitions from the active mode to the standby mode after the peripheral device is inactive for a prescribed period of time.

19. The apparatus of claim 14 further comprising a boost converter coupled between the second power source and the peripheral device.

20. The apparatus of claim 14 further comprising a switch coupled to the second power source, wherein the switch is closed if the peripheral device is turned on, and wherein the switch is open if the peripheral device is turned off.

\* \* \* \* \*